United States Patent Office 3,682,833
Patented Aug. 8, 1972

3,682,833
THERMOLUMINESCENT MATERIALS
Teiichi Hitomi, Noboru Kotera, and Hitoshi Sakamoto, Kamakura-shi, Japan, assignors to Dai Nippon Toryo Kabushiki Kaisha, Osaka-shi, Japan
Filed Aug. 20, 1969, Ser. No. 851,580
Claims priority, application Japan, Aug. 23, 1968, 43/59,823
Int. Cl. C09k 1/04
U.S. Cl. 252—301 R     14 Claims

ABSTRACT OF THE DISCLOSURE

A material prepared by adding a very small amount of terbium oxide as an activator to a complex oxide consisting of yttrium oxide and one member of the group consisting of sodium oxide, potassium oxide, magnesium oxide, boron oxide and aluminum oxide exhibits strong thermoluminescence at elevated temperatures after excitation with electron beams or ionizing radiations, and shows a high sensitivity in detection and measurement of the exposure dose of ionizing radiation.

---

Figure 1:
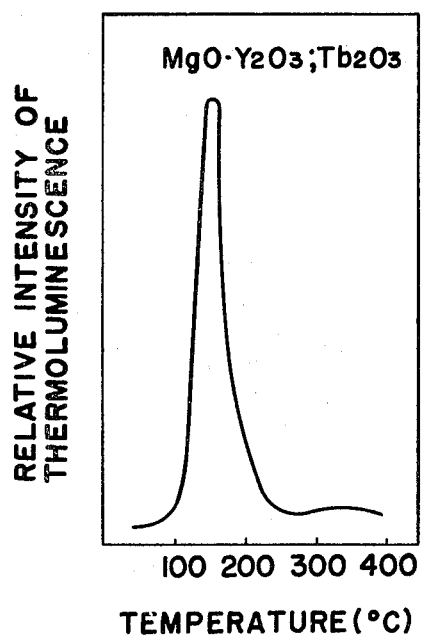

The present invention relates to novel thermoluminescent materials suitable for detection and measurement of the exposure dose of ionizing radiation.

With the development of atomic energy in recent years, ionizing radiations and radioactive materials have been utilized in medical science, industries and fundamental science: it is exemplified by diagnosis and therapy using X-rays and $\gamma$-rays, synthesis of high polymers of improvement of properties of them by $\gamma$-ray irradiation, and analysis of minute quantities of elements by radioactivation analysis. As a result of this increase in the utilization of ionizing radiation equipment, it becomes necessary to measure the exposure dose accurately and control it in order to protect operators of radiation and patients. There have been developed various methods to measure radiation, and among them, a thermoluminescent dosimeter using thermoluminescent materials has been particularly noticed and utilized in health physics and radiology because it is not only small, easily handled and available in various shapes such as powder and film, but also because it can measure exposure doses of various ionizing radiations over a wide range.

Thermoluminescence occurs as follows: when an electron or a positive hole in a thermoluminescent material in a ground energy state is excited by ionizing radiation, trapped in a metastable energy level formed by impurity atoms or defects in the crystal lattice and then heated so as to become free and return to the normal energy state, light is generated in the visible or near ultraviolet range of the spectrum. A thermoluminescent dosimeter utilizes the proportional relation between the relative intensity of the above-described thermoluminescence and the dose of radiation. Though many of the luminescent materials which have been heretofore ordinarily used for various purposes exhibit thermoluminescence more or less, few of them can be employed for a thermoluminescent dosimeter for the intensity of thermoluminescence of the luminescent material to be used in a dosimeter must not fade for a considerably long period of time after irradiation of ionizing radiation, until reading of the meter is begun. This is required since the dosimeter is of the cumulative type. Notwithstanding that a material must exhibit strong thermoluminescence on heating at higher than 100° C. for use in the said dosimeter, most of the thermoluminescent materials show thermoluminescence only at temperatures lower than room temperature.

There have been employed in dosimeters such thermoluminescent materials as lithium fluoride, calcium fluoride: manganese, and lithium borate; manganese, but these thermoluminescent materials now used do not have sufficient sensitivity to ionizing radiation and so it is difficult for them to detect doses lower than $10^{-2}$ R.

The present inventors have found that a material which is prepared by adding as an activator a very small amount of terbium oxide to a complex oxide consisting of yttrium oxide and an oxide selected from the group consisting of sodium oxide, potassium oxide, magnesium oxide, boron oxide and aluminum oxide exhibits strong thermoluminescence at high temperatures (from about 100° C. to about 350° C.) upon excitation with electron beams or various ionizing radiations, and can be used as a high sensitivity material in a thermoluminescent dosimeter.

Figure 2:
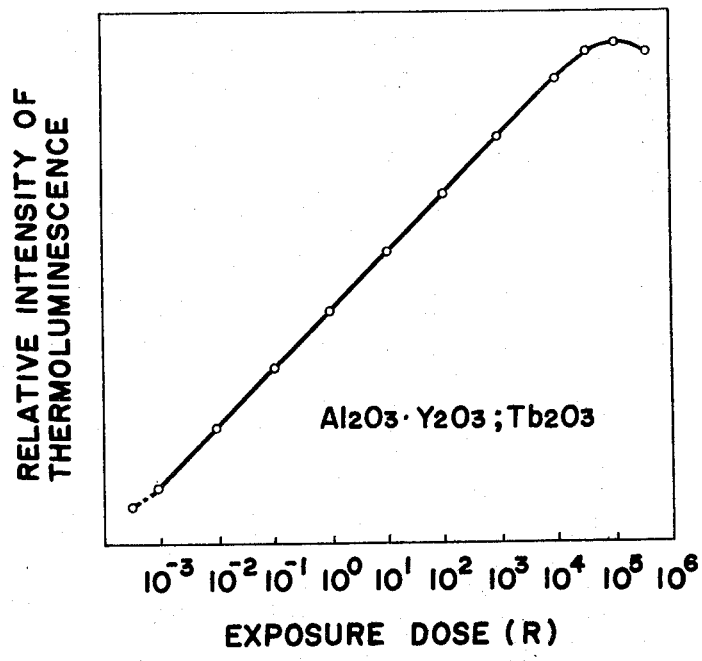

FIG. 1 shows the relation between the heating temperature and the intensity of thermoluminescence after exposing a sample of the thermoluminescent material of the present invention (terbium-activated magnesium-yttrium oxide) to X-rays. FIG. 2 shows the relation between the exposure dose and the intensity of thermoluminescence at 160° C. after exposing a sample of the thermoluminescent material of the present invention (terbium-activated aluminum-yttrium oxide) to X-rays or $Co^{60}$ $\gamma$-rays. FIG. 3 shows the relation between the ratio of aluminum oxide: yttrium oxide and the intensity of thermoluminescence (a) and the relation between the concentration of added terbium oxide and the intensity of thermoluminescence (b) as to terbium-activated aluminum yttrium oxide.

Figure 3A:
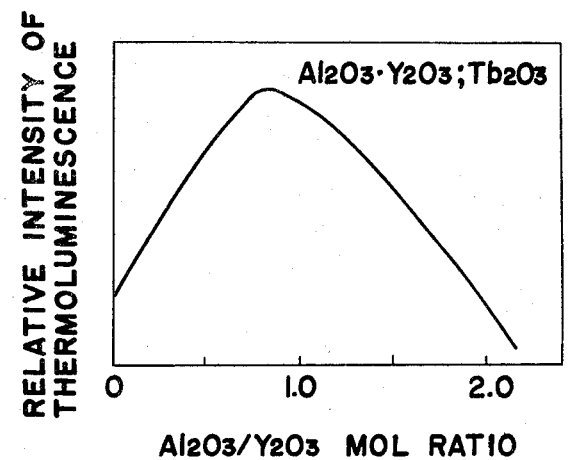

There is recognized a weak thermoluminescence with yttrium oxide alone, because of activation by terbium which is present as an impurity in the raw-material yttrium oxide, but when adding sodium oxide, potassium oxide or another of the above-described oxides to form a complex oxide, the intensity of thermoluminescence is particularly enhanced at about 160° C., as seen in FIG. 3(a): the activation by terbium is further increased by adding terbium oxide in order that a sufficiently high thermoluminescence for use in dosimetry may be achieved. The temperature at which the thermoluminescence peaks is seen to shift somehow from 160° C. depending on the oxide used. Yttrium aluminum garnet and alkaline earth yttrate are known as such a host system of luminescent material activated by terbium; though it generates a yellowish green light by excitation with electron beams or ultraviolet rays, the intensity of its thermoluminescence on excitation with radiation is so weak that it is hardly detected.

Figure 3B:
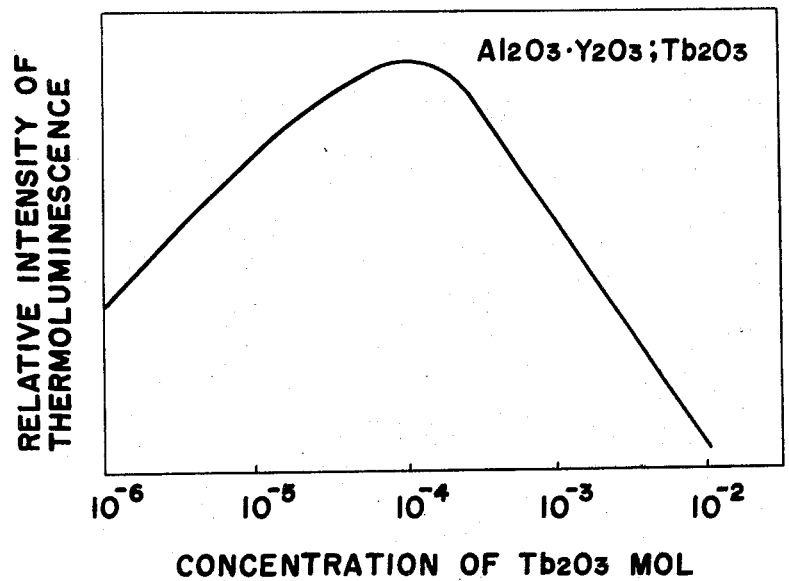

According to the present invention, it has been found that the adequate concentration of terbium, the activator relating to the intensity of thermoluminescence, is in a quite different range from that which is usually recognized for luminescent materials activated by rare earths: usually, for obtaining a good luminescent effect with an ordinary luminescent material, more than $10^{-2}$ gram atoms of a rare earth such as terbium should be added per mol of the host material. However, as seen in FIG. 3(b), the intensity of thermoluminescence of the thrmoluminescent material of the present invention is particularly high with a small amount of added terbium oxide: the intensity of thermoluminescence increases with an increase in the amount of terbium oxide added up to about $10^{-4}$ mol per mol of yttrium oxide, but when added in an amount higher than $10^{-3}$ mol, the intensity is remarkably reduced. Moreover, with a high concentration of terbium, pseudo-thermoluminescence due to such factors as abrasion is strongly exhibited at high temperature (near 350° C.) and it adversely affects the characteristics of the material used in the dosimeter. The oxides of rare earths other than terbium oxide do not interfere with the thermoluminescence of the thermoluminescent material according to the present invention, if the added amount is less than $10^{-4}$ mol.

The thermoluminescent material of the present invention is more sensitive than the thermoluminescent materials now used in dosimeters such as lithium fluoride, calcium fluoride manganese, and lithium borate manganese, and when using it in a dosimeter for X-rays, it can detect and measure an exposure dose as low as $10^{-3}$ R.

The thermoluminescent material of the present invention is shown by the general formula,

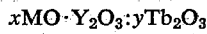
$$xMO \cdot Y_2O_3 : yTb_2O_3$$

wherein MO is a compound selected from a group consisting of sodium oxide, potassium oxide, magnesium oxide, boron oxide and aluminum oxide, and $x$ and $y$ are the number of mols of MO and $Tb_2O_3$, respectively. On blending the raw materials, $x$ and $y$ are effective in the ranges of 0.05–2.5 and $10^{-6}$–$5 \times 10^{-3}$, respectively, and particularly the most preferable result can be obtained when $x$ is from 0.4 to 1.4 and $y$ is from $5 \times 10^{-5}$ to $2 \times 10^{-4}$.

For manufacturing the thermoluminescent material according to the present invention, there are employed as the host materials of a thermoluminescent material, a compound selected from the group consisting of sodium oxide, potassium oxide, magnesium oxide, boron oxide, and aluminum oxide or a compound which can be easily converted to these oxides at high temperatures during the subsequent firing step, and yttrium oxide or a compound of yttrium which can also be easily converted to the oxide at high temperatures during the firing; to the said raw materials, terbium oxide or a compound of terbium which can also be easily converted to the oxide at high temperatures during the firing is added as an activator and blended sufficiently; then the mixture is put into an electric furnace, fired in air, and after quenching, it is pulverized. The mixture may be blended either in a dry method with such as a ball mill or in a wet method to make slurry of raw materials with water or ethyl alcohol or coprecipitate each material to form a mixed compound such as hydroxides; almost similar results can be obtained with each method.

The firing temperature is from 1300° C. to 1600° C. and a firing time of from 2 to 10 hours yields a good result, though it varies depending on the amount of the raw materials. It is preferable to sieve the fired and pulverized thermoluminescent material to make the particle size uniform. The thermoluminescent material may be fired in a stream of nitrogen, water vapor or argon instead of air, but the intensity of thermoluminescence of the thermoluminescent material fired in a nitrogen atmosphere is particularly enhanced at a slightly lower range of thermoluminescent temperature (100–120° C.), as compared with those fired in other atmospheres.

On manufacturing the thermoluminescent material according to the present invention, quenching in air or water after firing remarkably improves the intensity of thermoluminescence of the obtained thermoluminescent material. More preferably, when quenching in ice or ice water after firing, the intensity of thermoluminescence becomes about three times as high as that obtained by cooling in air.

When manufacturing the thermoluminescent material, the addition of 3–5% by weight of zinc oxide, lithium carbonate, arsenic oxide, acidic ammonium phosphate, or ammonium oxalate based on the host of the thermoluminescent material, i.e., $xMO \cdot Y_2O_3$, and firing, the reaction is accelerated and the intensity of thermoluminescence of the obtained thermoluminescent material is increased. In cases where the oxide, i.e., MO in the above formula is not boron oxide, the addition of 3–5% by weight of boron oxide, based on the host, is similarly effective. In all such cases, as to the thermoluminescent material derived from the host crystal of an oxide complex consisting of aluminum oxide and yttrium oxide, a good result is particularly obtained with boron oxide, acidic ammonium phosphate, ammonium oxalate and the like.

The thermoluminescent material thus prepared shows strong thermoluminescence in the range of temperature centering about 160° C. by irradiation, as seen in FIG. 1, and the intensity of thermoluminescence has a linear relation with the exposure dose of radiation in the range from $10^{-3}$ R to $10^4$ R, as seen in FIG. 2. When the thermoluminescent material once fired and quenched is heated as passing through an inert gas such while nitrogen or argon at temperatures lower than 1000° C., the intensity of thermoluminescence at about 160° C. is further increased.

The thermoluminescent material according to the present invention can be used as a thermoluminescent dosimeter which can detect and measure the exposure dose of electron beams and various radiations such as X-rays and $\gamma$-rays over a wide range from $10^{-3}$ R to $10^4$ R.

Examples of the thermoluminescent material and the preparation thereof according to the present invention are given below.

EXAMPLE 1

$Na_2CO_3$: 53.0 g. (0.5 mol)
$Y_2O_3$: 226.0 g. (1.0 mol)
$TbCl_3 6H_2O$: 0.07 g. ($2 \times 10^{-4}$ mol)

Among the above raw material, terbium chloride is dissolved in about 300 cc. of water, and sodium carbonate and yttrium oxide are added to the obtained solution to make a slurry; after blending sufficiently, the mixture is dried, pulverized and mixed with a sieve. The powder is packed in a quartz tube, and fired at 1400° C. for 5–7 hours in a water vapor flow in the tube; then, the flow of water vapor is stopped and the product is quenched in air; thus, there is obtained a thermoluminescent material which shows thermoluminescence having the peak at about 150° C. by excitation with electron beams and various radiations such as X-rays and $\gamma$-rays.

EXAMPLE 2

$K_2CO_3$: 69.1 g. (0.5 mol)
$Y_2O_3$: 226.0 g. (1.0 mol)
$Tb_2O_3$: 0.04 g. ($10^{-4}$ mol)

The above raw materials are sufficiently mixed in a ball mill, packed in an alumina crucible and put into a high temperature electric furnace; after firing at 1400° C. for 5–7 hours in air and quenching in air, there is obtained a thermoluminescent material having the peak of thermoluminescence at about 155° C. by excitation with electron beams and ionizing radiations such as X-rays and $\gamma$-rays.

EXAMPLE 3

MgO: 20.2 g. (0.5 mol)
$Y_2O_3$: 226.0 g. (1.0 mol)
$Tb_2(SO_4)_2 8H_2O$: 0.08 g. ($10^{-4}$ mol)
$(NH_4)_2HPO_4$: 9.8 g.

The above raw materials are pulverized and mixed sufficiently in a ball mill, packed in an alumina crucible and put into a high temperature electric furnace; after firing at 1400° C. for 5–7 hours in air and quenching in water, there is obtained a thermoluminescent material having a peak of thermoluminescence at about 155° C. by excitation with electron beams and ionized radiations such as X-rays and $\gamma$-rays, as shown in FIG. 1.

EXAMPLE 4

$H_3BO_3$: 31.1 g. (0.6 mol)
$Y_2(C_2O_4)_3 \cdot 9H_2O$: 604.1 g. (1.0 mol)
$Tb_2(C_2O_4)_3 \cdot 9H_2O$: 0.07 g. ($10^{-4}$ mol)

The above materials are sufficiently mixed in a ball mill and packed in a quartz tube; after substituting the air in the tube with nitrogen, the mixture is fired at 1400° C. for 5 hours in a nitrogen gas flow with a flow rate of about 0.5 liter per minute and then quenched: there is obtained a thermoluminescent material having a peak of thermoluminescence at about 120° C. by excitation with electron beams and ionizing radiations such as X-rays and γ-rays.

EXAMPLE 5

$(NH_4)Al(SO_4)_2 \cdot 12H_2O$: 634.8 g. (1.4 mol)
$Y_2O_3$: 226.0 g. (1.0 mol)
$Tb_2O_3$: 0.04 g. ($10^{-4}$ mol)

The above materials are dissolved in about 1.5 liter of 6 N hydrochloric acid, and then about 900 cc. of 28% ammonia water are added and coprecipitate to form the hydroxide. It is sufficiently dried, pulverized, packed in an alumina crucible, and then put in a high temperature electric furnace; after firing at 1400° C. for 5–7 hours in air and quenching, there is obtained a thermoluminescent material having a peak of thermoluminescence at about 160° C. by excitation with electron beams and ionizing radiations such as X-rays and γ-rays.

EXAMPLE 6

$Al_2O_3$: 81.6 g. (0.8 mol)
$Y_2O_3$: 226.0 g. (1.0 mol)
$Tb_2O_3$: 0.04 g. ($10^{-4}$ mol)
$B_2O_3$: 9.2 g.

The above raw materials are mixed sufficiently in a ball mill, packed in an alumina crucible, and put into a high temperature electric furnace; after firing at 1500° C. for 5–7 hours in air, the product is put into iced water to quench it. Then, the obtained crystal is packed in a quartz tube, and after completely substituting the air in the tube with nitrogen gas, it is heated at 800° C. for 2 hours while supplying nitrogen gas into the tube with flow rate of about 0.5 liter per minute: after quenching, there is obtained a thermoluminescent material having a peak of thermoluminescence at about 160° C. by excitation with electron beams and ionizing radiations such as X-rays and γ-rays.

What we claim is:

1. A thermoluminescent material consisting of a complex oxide having the molar composition:

$xMO \cdot Y_2O_3 : yTb_2O_3$ wherein MO is a compound selected from the group consisting of sodium oxide, potassium oxide, magnesium oxide, boron oxide and aluminum oxide, $x$ is the molar ratio of MO to yttrium oxide and is between 0.05 and 2.5, and $y$ is the molar ratio of terbium oxide to yttrium oxide and is between $10^{-6}$ and $5 \times 10^{-3}$.

2. A thermoluminescent material according to claim 1, wherein $x$ is between 0.4 and 1.4, and $y$ is between $5 \times 10^{-5}$ and $2 \times 10^{-4}$.

3. A thermoluminescent material according to claim 1, wherein MO is magnesium oxide.

4. A thermoluminescent material according to claim 1, wherein MO is boron oxide.

5. A thermoluminescent material according to claim 1, wherein MO is aluminum oxide.

6. A thermoluminescent material consisting of a complex oxide having the molar composition:

$xAl_2O_3 \cdot Y_2O_3 : yTb_2O_3$ wherein $x$ is the molar ratio of aluminum oxide to yttrium oxide and is between 0.05 and 2.5, $y$ is the molar ratio of terbium oxide to yttrium oxide and is between $10^{-6}$ and $5 \times 10^{-3}$, and from 3 to 5 percent by weight of boron oxide based on $xAl_2O_3 \cdot Y_2O_3$.

7. A process for manufacturing a thermoluminescent material which comprises adding to a host raw mixture of yttrium oxide or a compound of yttrium which can be converted to the oxide in the succeeding firing step and a compound selected from the group consisting of sodium oxide, potassium oxide, magnesium oxide, boron oxide, aluminum oxide and compounds which can be converted to said oxides in the succeeding firing step, wherein the oxide molar ratio of said selected compound to yttrium oxide or the yttrium compound is between 0.05 and 2.5, terbium oxide or a compound of terbium which can be converted to the oxide in the succeeding firing step, the oxide molar ratio of said terbium oxide or terbium compound to said yttrium oxide or yttrium compound being between $10^{-6}$ and $5 \times 10^{-3}$, blending the mixture, firing same at a temperature between 1300° C. and 1600° C. for 2 to 10 hours in air or in a stream of nitrogen, water vapor or argon, quenching same in air or in ice and/or water, and pulverizing.

8. A process as claimed in claim 7, wherein quenching is performed in ice or ice-water.

9. A process as claimed in claim 7, wherein from 3 to 5 percent by weight of a compound selected from the group consisting of zinc oxide, lithium carbonate, arsenic oxide, acidic ammonium phosphate and ammonium oxalate, based on the host of said thermoluminescent material is added to said host raw mixture.

10. A process as claimed in claim 7, wherein the thermoluminescent material after being once fired and quenched is heated at a temperature between 800° C. and 1000° C. in an atmosphere of an inert gas.

11. A process for manufacturing a thermoluminescent material which comprises adding to a host raw mixture of yttrium oxide or a compound of yttrium which can be converted to the oxide in the succeeding firing step and a compound selected from the group consisting of sodium oxide, potassium oxide, magnesium oxide, aluminum oxide and compounds which can be converted to said oxides in the succeeding firing step wherein the oxide molar ratio of said selected compound to said yttrium oxide or yttrium compound is between 0.05 and 2.5, terbium oxide or a compound of terbium which can be converted to oxide in the succeeding firing step, the oxide molar ratio of said terbium oxide or terbium compound to yttrium oxide or yttrium compound being between $10^{-6}$ and $5 \times 10^{-3}$, and from 3 to 5 percent by weight of boron oxide based on the host of said thermoluminescent material, blending the mixture, firing same at a temperature between 1300° C. and 1600° C. for 2 to 10 hours in air or in a stream of nitrogen, water vapor or argon, quenching in air or in ice and/or water, and pulverizing.

12. A process as claimed in claim 11, wherein quenching is performed in ice or ice-water.

13. A process as claimed in claim 11, wherein the thermoluminescent material after being once fired and quenched is heated at a temperature between 800° C. and 1000° C. in an atmosphere of an inert gas.

14. A process as claimed in claim 11, wherein said selected compound is aluminum oxide or an aluminum compound which can be converted to aluminum oxide in said succeeding firing step.

References Cited

UNITED STATES PATENTS 3,450,643   6/1969   Hoffman ........... 252—301.6

TOBIAS E. LEVOW, Primary Examiner

J. COOPER, Assistant Examiner

U.S. Cl. X.R.

252—301.4 R